US010205641B2

(12) United States Patent
McGrew et al.

(10) Patent No.: US 10,205,641 B2
(45) Date of Patent: Feb. 12, 2019

(54) INSPECTION OF TRAFFIC VIA SDN

(71) Applicant: Cisco Technology, Inc., San Jose, CA (US)

(72) Inventors: David McGrew, Poolesville, MD (US); Kenneth S. Beck, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 422 days.

(21) Appl. No.: 14/802,033

(22) Filed: Jul. 17, 2015

(65) Prior Publication Data

US 2017/0019417 A1    Jan. 19, 2017

(51) Int. Cl.
*H04L 12/26*    (2006.01)
*H04L 29/06*    (2006.01)

(52) U.S. Cl.
CPC .......... *H04L 43/026* (2013.01); *H04L 43/062* (2013.01); *H04L 43/12* (2013.01); *H04L 63/14* (2013.01)

(58) Field of Classification Search
CPC . H04L 63/1416; H04L 63/0428; H04L 43/12; H04L 43/062; H04L 43/026
USPC .......................................................... 726/23
See application file for complete search history.

(56) References Cited

U.S. PATENT DOCUMENTS

| | | | |
|---|---|---|---|
| 6,886,102 B1 * | 4/2005 | Lyle ...................... | G06F 21/554 709/206 |
| 6,971,028 B1 * | 11/2005 | Lyle ...................... | G06F 21/554 709/224 |
| 7,023,861 B2 * | 4/2006 | Makinson ........... | H04L 63/0209 370/401 |
| 7,805,329 B2 * | 9/2010 | Maeckel ................ | G06Q 10/06 705/7.28 |
| 7,899,048 B1 * | 3/2011 | Walker ................ | H04L 12/4641 370/390 |
| 9,413,667 B2 * | 8/2016 | Beliveau ................ | H04L 47/122 |
| 9,571,523 B2 * | 2/2017 | Porras ...................... | H04L 63/20 |
| 2005/0053073 A1 * | 3/2005 | Kloth ....................... | H04L 43/00 370/395.41 |
| 2007/0076606 A1 * | 4/2007 | Olesinski ............. | H04L 41/0893 370/230 |
| 2011/0242994 A1 * | 10/2011 | Carvalho .............. | H04L 43/022 370/252 |
| 2014/0233385 A1 * | 8/2014 | Beliveau ................ | H04L 47/122 370/235 |
| 2015/0150079 A1 | 5/2015 | Hyatt et al. | |
| 2015/0195197 A1 | 7/2015 | Yong et al. | |

(Continued)

Primary Examiner — Matthew T Henning
(74) Attorney, Agent, or Firm — Edell, Shapiro & Finnan, LLC

(57) ABSTRACT

A method and related apparatus for performing inspection of flows within a software defined network includes identifying a security appliance within a software defined network, identifying candidate traffic flows flowing in the software defined network to be inspected, selecting one of the candidate traffic flows for security inspection, and communicating with a software defined network controller to cause the one of the candidate traffic flows to be redirected towards the security appliance for inspection or to cause the one of the candidate traffic flows to be copied and a resulting copy thereof forwarded to the security appliance for inspection.

16 Claims, 6 Drawing Sheets

(56) References Cited

U.S. PATENT DOCUMENTS

2015/0256431 A1\* 9/2015 Buchanan ............... H04L 67/22
709/224
2016/0127218 A1\* 5/2016 Maloo ..................... H04L 43/12
370/390

\* cited by examiner

INSPECTION OF TRAFFIC VIA SDN

TECHNICAL FIELD

Embodiments described herein relate to operations of a software defined network.

BACKGROUND

Software-defined networking (SDN) is an approach to computer networking that allows network administrators to manage network services through abstraction of lower-level functionality. This is done by decoupling the system that makes decisions about where traffic is sent (the control plane) from the underlying systems that forward traffic to the selected destination (the data plane).

A security device or appliance, such as, e.g., an intrusion detection system (IDS), is a device or software application that monitors network or system activities for malicious activities or policy violations and produces reports to a management station. IDSs come in a variety of "flavors" and approach the goal of detecting suspicious traffic in different ways. Some systems may attempt to stop an intrusion attempt but this is neither required nor expected of a monitoring system. Thus, IDSs are primarily focused on identifying possible incidents, logging information about them, and reporting and/or notification functionalities.

DESCRIPTION OF EXAMPLE EMBODIMENTS

Overview

Figure 1:
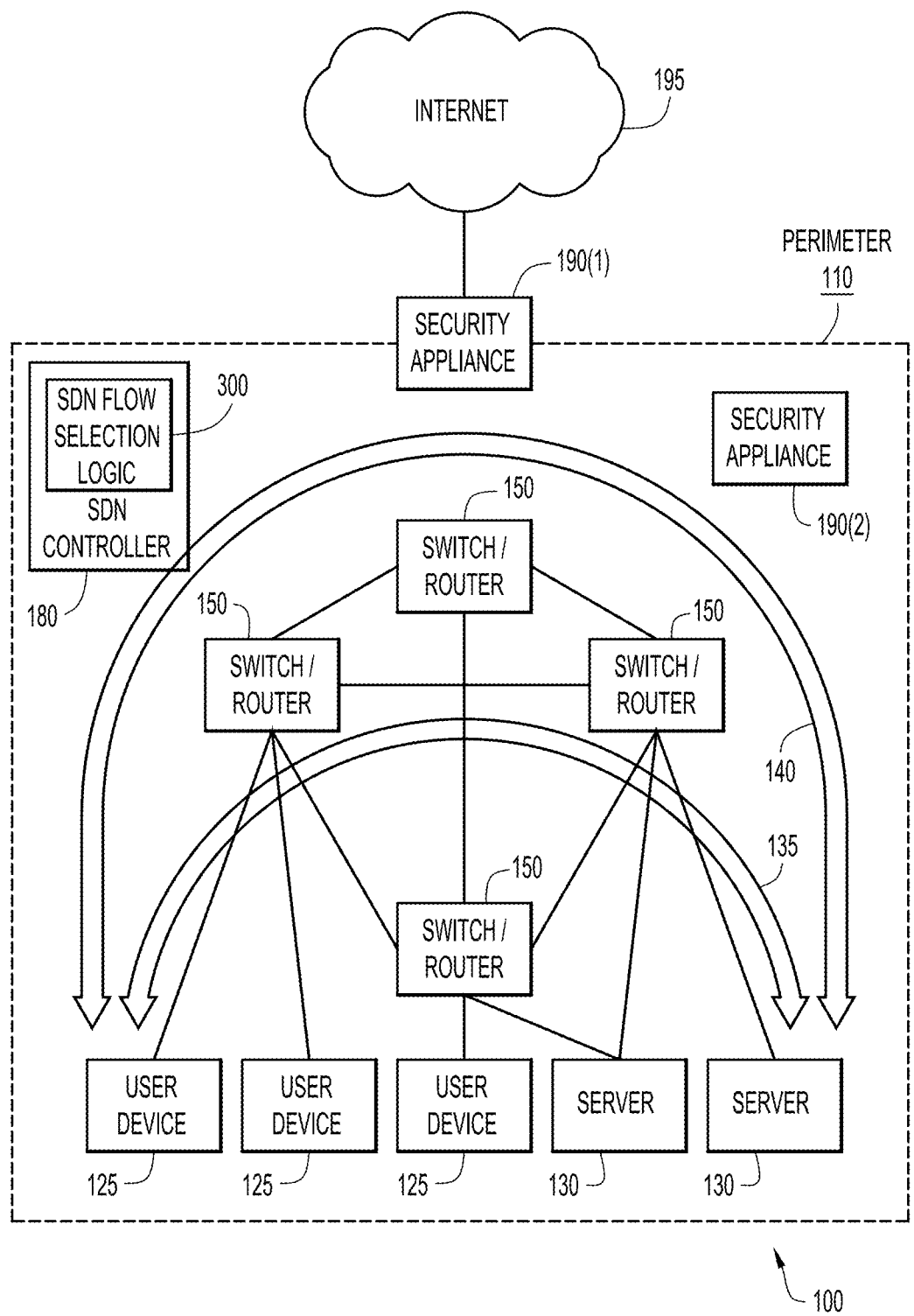
FIG. 1 is a block diagram of components that may be employed to implement traffic inspection in a software defined network according to an example embodiment.

A method and related apparatus for performing inspection of flows within a software defined network is described. The methodology includes identifying a security appliance, such as, e.g., an intrusion detection system, within a software defined network, identifying candidate traffic flows flowing in the software defined network to be inspected, selecting one of the candidate traffic flows for security inspection, and communicating with a software defined network controller to cause the one of the candidate traffic flows to be redirected towards the security appliance for inspection or to cause the one of the candidate traffic flows to be copied and a resulting copy thereof forwarded to the security appliance for inspection.

Example Embodiments

In the following description, the terms "traffic," "flow" and "traffic flow" are used interchangeably, and are meant to encompass data communications passing through an electronic network between any two endpoints. Most "east-west" traffic on internal networks, i.e., internal traffic, is not inspected by a security device such as an Intrusion Detection System (IDS) or Firewall, due to the overhead of security inspection. It can be too costly to put an IDS everywhere. Instead, it is commonplace to deploy an IDS or Firewall between a set of trusted devices and a larger network, e.g., between a datacenter and the Internet. Such a deployment is sometimes referred to as a perimeter deployment. However, malware can nevertheless make its way onto a trusted network, and can thereafter perform reconnaissance, marshal data to be exfiltrated, propagate itself, and conduct other mischief. Thus, there is a strong need to inspect traffic to detect malware infected devices, yet traffic behind a security appliance can often go wholly uninspected.

Perimeter devices aim to detect malware communication that traverses the security perimeter, but they are not always successful. This is because the malware communication may be sufficiently hard to detect, or because the malware infection propagates and communicates through some other means, such as via removable media, multihoming (e.g., malware can communicate to its command and control server when it is a remote network access point, e.g., a coffee shop, but not when it is on the corporate network), or "spear phishing" by targeting individuals with email designed to get them to click a link to a malware source. Thus, the embodiments described provide additional means of detecting malware that has successfully founds its way onto a trusted network.

In accordance with one embodiment, malware detection leverages capabilities of a software defined network. As will be described in more detail herein below, to detect malware in a SDN-enabled network, selected traffic, which would otherwise go uninspected, is sampled, and the SDN is used to route or copy the sampled traffic to an inspection device. The sampling process can be configured such that communication from each endpoint is inspected at some time, thus making it probable that malware infections can be detected.

Thus, in accordance with an embodiment, SDN enables traffic that would normally go uninspected to be routed through an inspection device. Specifically, the SDN can be configured to enable the inspection of particular traffic by redirecting or copying the traffic, and forwarding the same to an inspection device. In a typical network, there is much traffic that normally bypasses inspection due to the network topology and because, often times, there is just too much traffic to inspect it all. That is, it is impractical (if not impossible) to route or copy all of the traffic to an inspection device because of bandwidth constraints, and the computational cost of inspecting all of the traffic may be prohibitive.

Embodiments described herein address the forgoing by sampling traffic (sometimes randomly or arbitrarily), then routing that traffic to an inspection service (i.e., a security appliance), such as an IDS device. Alternatively, the traffic to be sampled is copied and a resulting copy of the traffic is forwarded to the inspection device. In one possible implementation, a random process is used to select traffic for inspection, and when traffic is selected, it is inspected for some period of time. When that period ends, other traffic is selected.

The embodiments described herein are effective at detecting a device that is infected with malware because the random sampling process makes it likely that some malware communication from an infected device will be inspected at some point. While it might be true that much malware communication might go uninspected, due to the random nature of the sampling, eventually such traffic will be sampled and detection will occur.

The described approach takes advantage of an SDN controller's topological and endpoint session awareness, when available, for targeting. That is, traffic or flows can be targeted, rather than randomly or arbitrarily selected. Examples of target selectors include: Internet Protocol (IP) address, layer 2 address, email address, network tuple, user, destination geographic area, and application type. As another example, new flows from one switch port to another switch port could be targeted for inspection.

In addition, the sampling process can be weighted to traffic considered more likely to contain threats. For instance, sampled traffic can be selected based on targets an attacker might be more likely to be interested in. In this regard, a risk-factor and a value of the data being accessed can also be considered, as can a destination of the data. Additionally, a threat defense application or an administrator can indicate which hosts deserve heightened interest for targeting for inspection by indicating the priority of each host. Alternatively, a policy system that identifies which devices might be more sensitive (e.g., TrustSec security groups) can be leveraged for information about sensitive devices.

The traffic can be sent either inline (redirected) or out-of-line using, e.g., a switch port analyzer (SPAN) to obtain a copy of the traffic. In either case, the ability of the SDN to route traffic through specific hops is used to get the traffic to the inspection service.

The mechanism used to program the network devices to effect the redirection or copying can be any programmatic interface such as "North Bound" APIs to a network controller or directly to device APIs depending upon the capabilities and policies of the network. The application performing the selection can be housed anywhere in the network where appropriate processing and memory capabilities are available, such as within an SDN controller itself, on a blade or server in a datacenter, a blade in a network device, the Control Plane of a Firewall, etc. depending upon the nature of the API used, device capability and network or security policy.

Reference is now made to FIG. 1, which depicts a block diagram of components that may be employed to implement traffic inspection in a software defined network according to an example embodiment. As shown, a network topology 100 within a defined perimeter 110 comprises a plurality of user devices 125, including, e.g., computers, laptops, wireless devices, or any end user computing device that can connect with a network. Network topology 100 further includes servers 130, which can host any number of applications, databases, web servers or other computing functionality that might be of interest to any given user device 125.

Also included within network topology 100 are a plurality of switches or routers (switches/routers) 150 that are configured to enable data or communications traffic to flow between a given user device 125 and a given server 130. Such data or communication traffic is depicted by double headed arrow 135.

In addition to the foregoing components, also provided is a security appliance 190(1) that is disposed at perimeter 110 and is configured to monitor "north-south" data traffic coming from and going to the Internet 195. Security appliance 190(2) may be a separate security appliance that may be dedicated to operate in accordance with embodiments described herein. Security appliances 190(1), 190(2) (hereinafter "190") may be intrusion detection systems or any other data/communications monitoring device or system that can analyze data traffic and identify malware or other suspicious activity.

In accordance with embodiments described herein, network topology 100 is controlled by SDN controller 180, which is in communication with, e.g., switches/routers 150 to set up and tear down communication paths between a given user device 125 and a given host 130. In the implementation depicted in FIG. 1, SDN controller 180 hosts SDN flow selection logic 300, the features of which are described in detail in connection with FIGS. 3-5. At a high level, SDN flow selection logic 300 is responsible for selecting a given data flow for sampling, effecting either a redirection of the selected flow or a copying of the selected flow, and causing the redirected flow or copy of the selected flow to be forwarded to security appliance (also referred to as "service") 190 for analysis.

Figure 2:
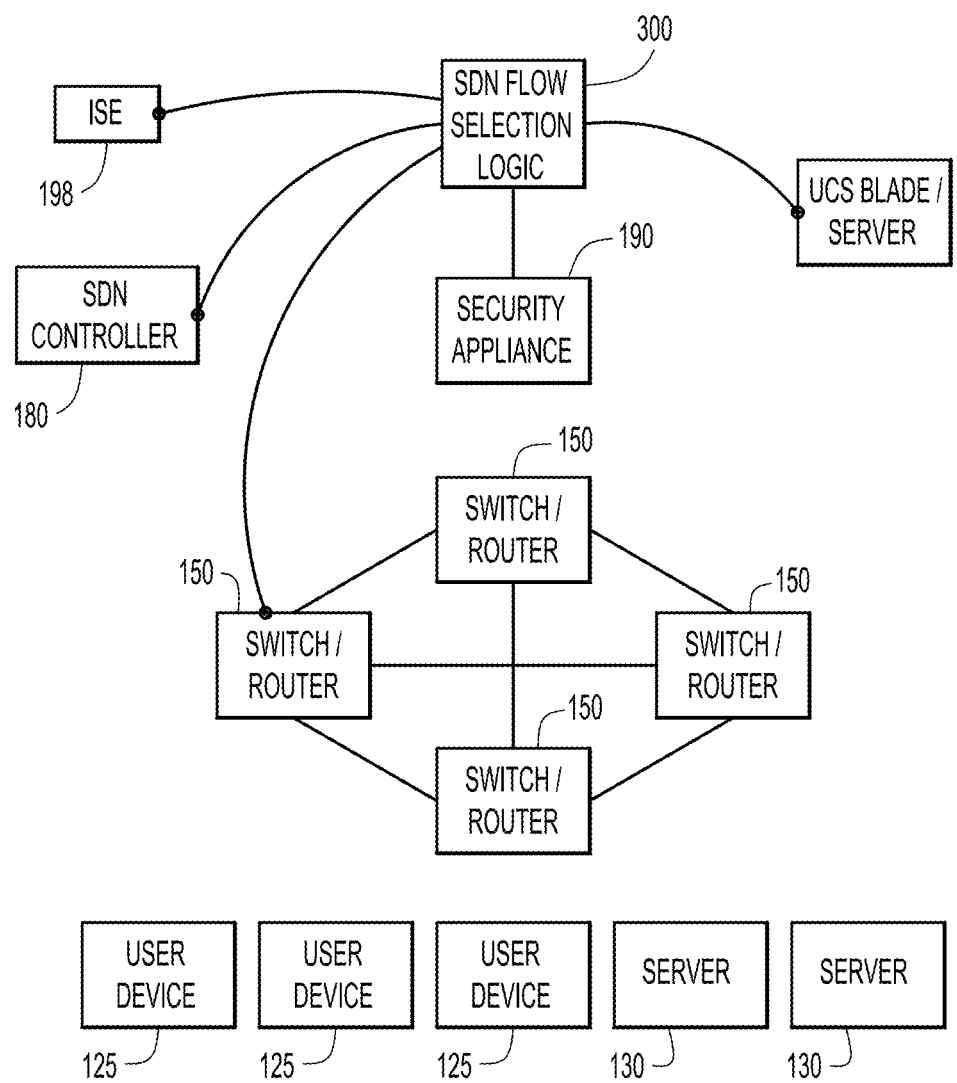
FIG. 2 depicts several locations within a network on which SDN flow selection logic may be hosted according to an example embodiment.

Although FIG. 1 depicts SDN flow control logic 300 being hosted by SDN controller 180, SDN flow selection logic 300 can be hosted in any of a number of locations or even distributed among such locations. More specifically, FIG. 2 depicts several locations within a network on which SDN flow selection logic 300 may be hosted according to an example embodiment. As shown, SDN flow selection logic 300 can be hosted on switches/routers 150, an Identity Services Engine (ISE) 198, a unified communications system blade or server 195, or even on a dedicated device (not shown), or distributed across such components.

Figure 3:
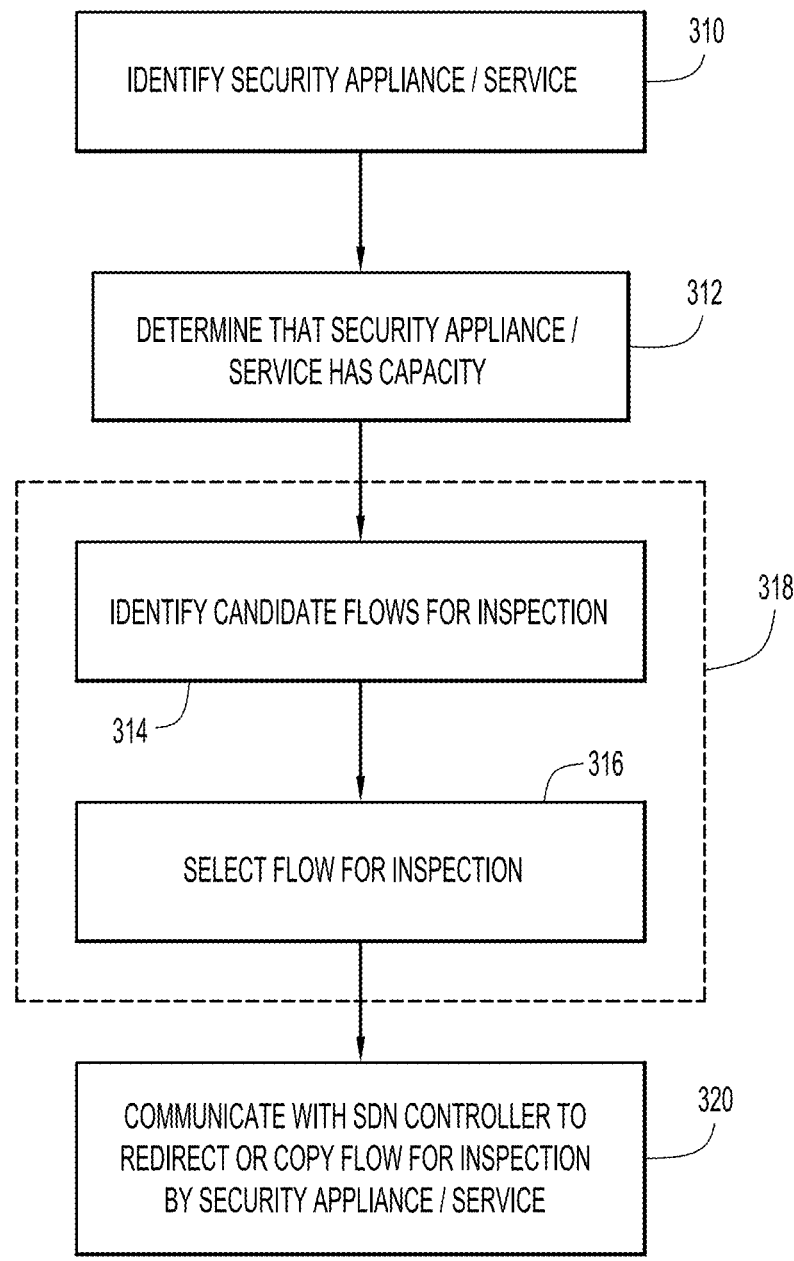
FIG. 3 is an example flow chart depicting a series of operations for performing traffic inspection in a software defined network according to an example embodiment.

FIG. 3 is an example flow chart depicting a series of operations for performing traffic inspection in a software defined network according to an example embodiment. That is, FIG. 3 depicts operations performed by SDN flow selection logic 300. With reference to FIG. 3, at 310, a security service is identified. The security service may be, e.g., IDS 190. At 312, SDN flow selection logic 300 determines whether the identified security service has sufficient capacity to take on new traffic or flow analysis or inspection. At 314, SDN flow selection logic 300 identifies candidate flows for inspection. And at 316, one or more of those candidate flows is selected for inspection. As indicated by 318, operations 314 and 316 may be considered as a single operation. Further details regarding how flows might be selected for analysis are provided herein below.

At 320, SDN flow selection logic 300 is configured to communicate with an SDN controller, e.g., SDN controller 180, to cause the SDN controller to redirect the selected flow or make a copy of the selected flow for inspection by the security device.

As noted, SDN flow selection logic 300 identifies candidate flows and selects flows for inspection, as indicated by operation 318. There are multiple ways in which this selection process might be implemented. One option is to monitor the type of application that is the subject of the flow. That is, certain applications may be known to be more susceptible to carrying malware. As such, those applications could be targeted for selection. Flow selection may also be based on a given user. User information may be obtained, for example, from ISE 198. That is, certain users might have a reputation for being subjected to malware, or even being a source of malware. Flows associated with such users could be targeted.

IP addresses, layer 2 addresses, email addresses, or any combination thereof to create a network tuple, can also be used as a basis to select a given flow to inspect. In addition, new flows can be targeted more than existing flows. That is, newly established flows from one switch port to another switch port can be targeted for inspection.

As also mentioned, the sampling process can be weighted to traffic considered more likely to contain threats. For instance, traffic can be selected based on targets an attacker might be more likely to be interested in. In this regard, a risk-factor and a value of the data being accessed can also be considered, as can a destination of the data (e.g., a geographical area), i.e., the destination to which the data is being sent. Additionally, a threat defense application or an administrator can likewise be leveraged to indicate which hosts deserve heightened interest for targeting for inspection by indicating a priority of each host. Alternatively, a policy system that identifies which devices might be more sensitive (e.g., by leveraging TrustSec security groups) can be leveraged for information about sensitive devices, and flows associated with such devices can receive heightened targeting and selection. Those skilled in the art will appreciate that the foregoing approaches to weighting are only examples, and other approaches can also be implemented in accordance with the principles described herein.

Figure 4:
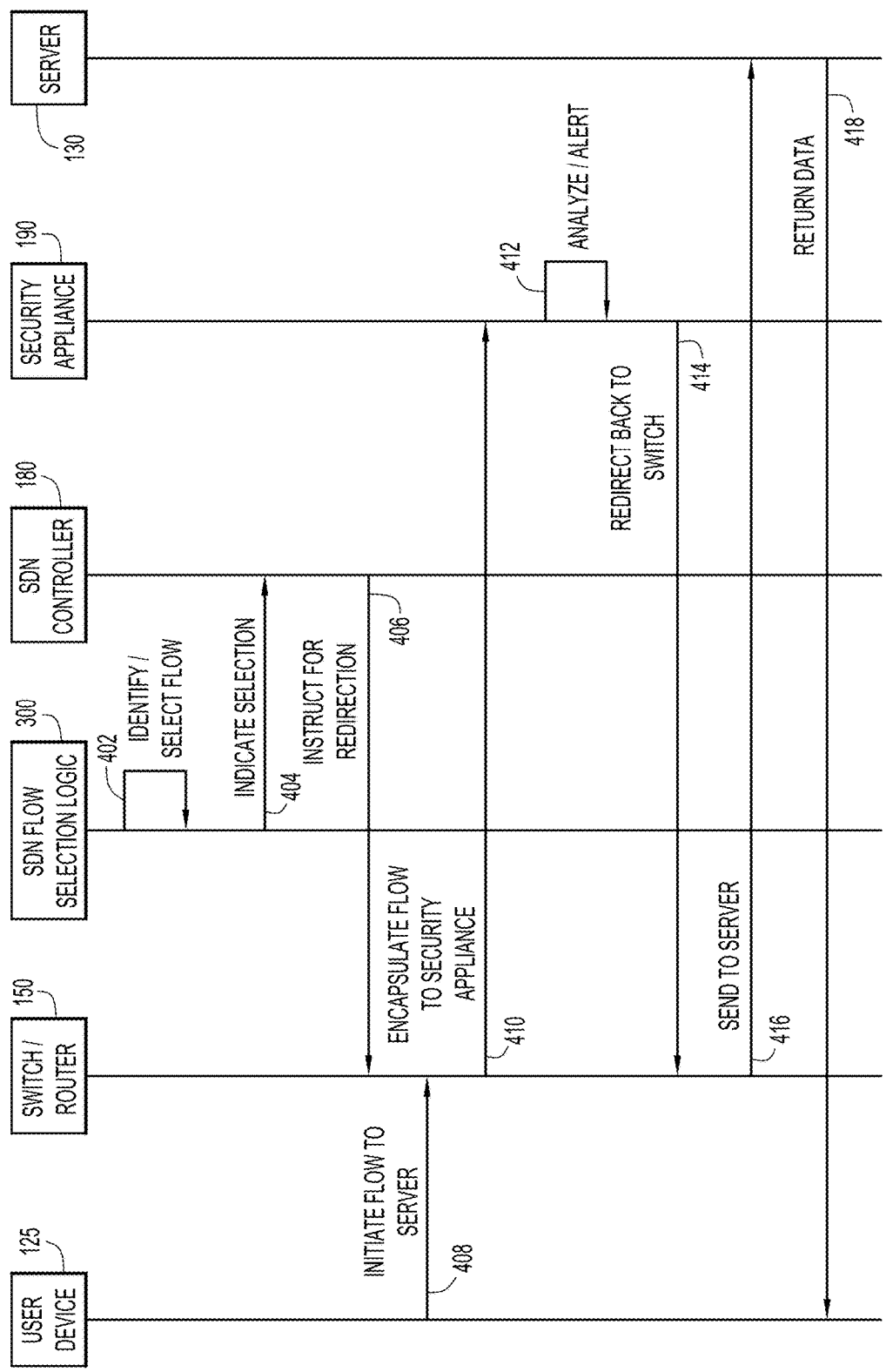
FIGS. 4 and 5 are example ladder diagrams depicting a series of operations to implement traffic inspection in a software defined network according to an example embodiment.
Figure 5:
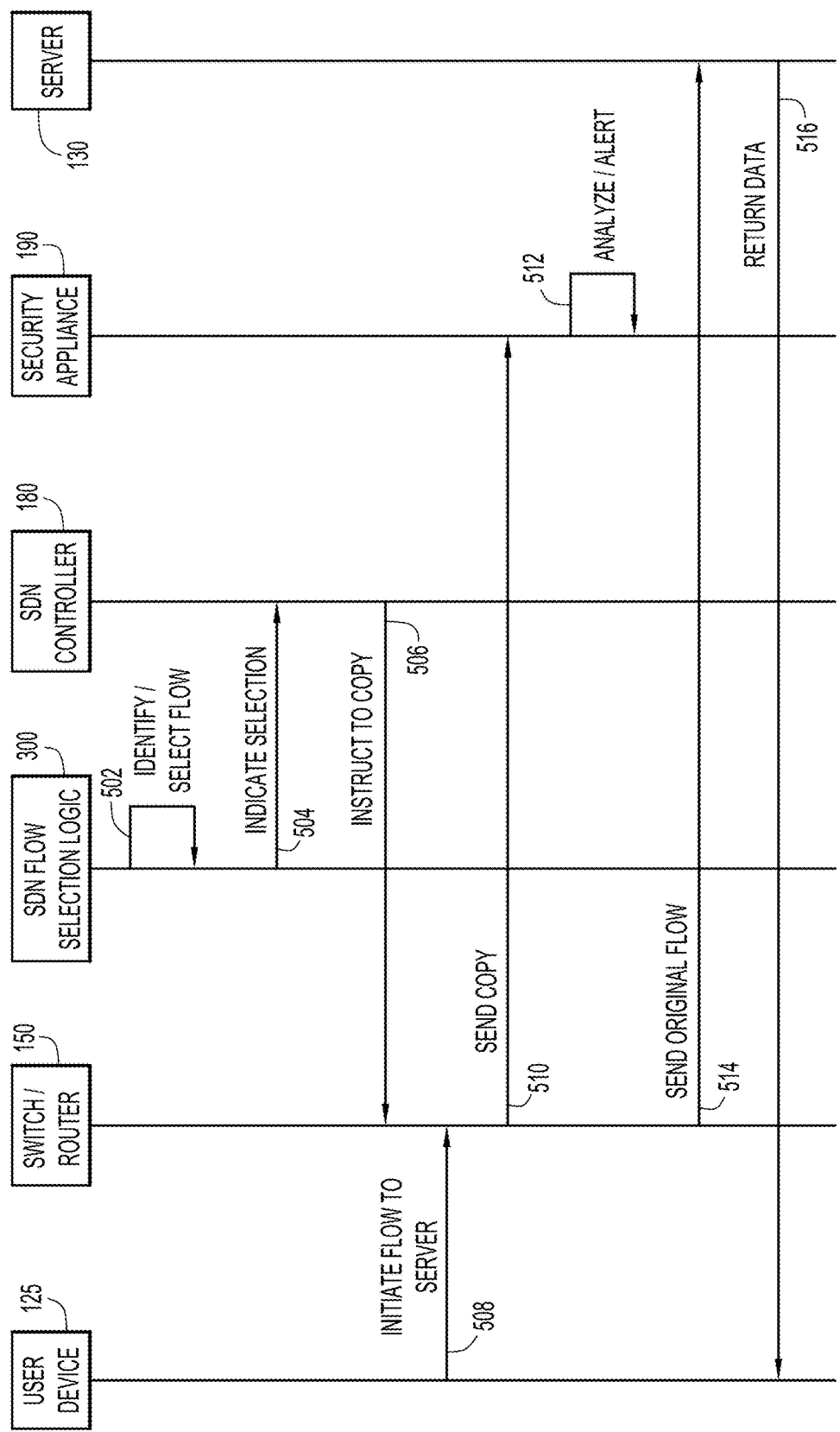

FIGS. 4 and 5 are example ladder diagrams depicting a series of operations to implement traffic inspection in a software defined network according to an example embodiment. FIG. 4 depicts example operations where a selected flow is redirected to a security device for inspection, whereas FIG. 5 depicts example operations where a selected flow is copied and the resulting copy is forwarded to a security device for inspection.

Referring first to FIG. 4, the same network components depicted in FIG. 1 are also depicted at the top of FIG. 4. That is, user device 125, switch/router 150, SDN flow selection logic 300, SDN controller 180, security service appliance 190 and server 130 are shown as being part of an overall process to enable traffic within a network to be selectively inspected.

At 402, SDN flow selection logic 300 identifies candidates flows and selects at least one such flow for inspection. At 404, SDN flow selection logic 300 notifies SDN controller 180 of the selection. SDN controller 180, at 406, instructs switch/router 150 to redirect the selected flow. Such redirection can be effected via encapsulation. It is noted that the OpenFlow communication protocol/standard may also be employed to effect redirection. At 408, user device 125 sends a flow toward switch/router 150, i.e., the selected flow. It is noted that operation 408 could have occurred before nay of operations 402-406. At 410, switch/router 150 causes the selected flow to be encapsulated such that the flow is redirected to security device 190. At security device 190, the flow is subjected to inspection as indicated by 412. An alert can be raised, a notification can be sent, and/or information can be logged in accordance with the particular security device functionality. The flow can also be blocked if so desired. At 414, as a result of the encapsulation to effect the redirection, the flow is redirected back to switch/router 150, whereupon, at 416, the flow is sent to server 130 as was originally intended. At 418, server 130 responds to user device 125 by sending appropriate data in connection with the flow.

Those skilled in the art will appreciate that, although FIG. 4 depicts inspection of a flow coming from user device 125, a flow originating from server 130 can be inspected in the very same way.

Reference is now made to FIG. 5, which depicts an embodiment wherein a copy of a selected flow is forwarded to a security appliance. At 502, SDN flow selection logic 300 identifies candidates flows and selects at least one such flow for inspection. At 504, SDN flow selection logic 300 notifies SDN controller 180 of the selection. SDN controller 180, at 506, instructs switch/router 150 to copy the selected flow. Copying may be implemented using SPAN, for example. At 508, user device 125 sends a flow toward switch/router 150, i.e., the selected flow. At 510, after making a copy of the flow, switch/router 150 sends the copy to security device 190. At security device 190, the flow is subjected to inspection as indicated by 512. An alert can be raised, a notification can be sent, and/or information can be logged in accordance with the particular security device functionality. Meanwhile at 514, the original flow is sent from switch/router 150 to server 130 as was originally intended. At 516, server 130 responds to user device 125 by sending appropriate data.

Those skilled in the art will appreciate that, although FIG. 5 depicts inspection of a flow coming from user device 125, a flow originating from server 130 can be inspected in the very same way, i.e., by copying and forwarding the resulting copy of the flow from server 130 to the security device 190.

Figure 6:
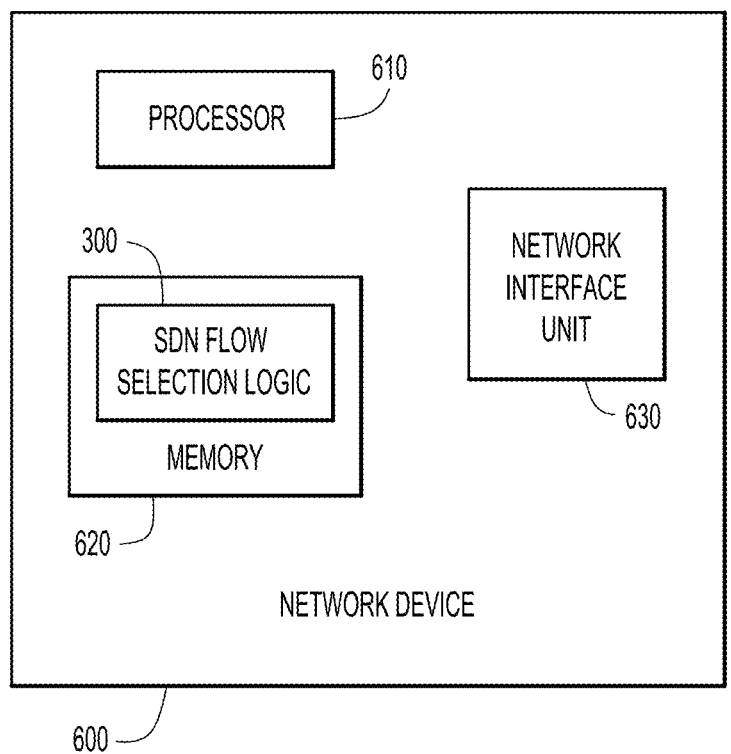
FIG. 6 depicts a block diagram of a network device on which SDN flow selection logic may be hosted according to an example embodiment.

FIG. 6 depicts a block diagram of a network device 600 on which SDN flow selection logic 300 may be hosted according to an example embodiment.

Such a network device includes a processor 610, memory 620 and a network interface unit 630. Processor 610 may be configured to perform the functions of flow selection logic 300 (i.e., the operations depicted in FIG. 3), among other functions. Memory 620 is configured to store a variety of data and software instructions including flow selection logic 300. Network interface unit 630 may include one or more ports or network interface cards via which the network device 600 can communicate with network components such as SDN controller 180 and switches/routers 150, among other components.

Processor 610 may be, for example, a microprocessor or microcontroller that executes instructions for implementing the processes described herein. Memory 620 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 620 may comprise one or more tangible (non-transitory) computer readable storage media (e.g., a memory device) encoded with software comprising computer executable instructions and when the software is executed (by processor 610) is operable to perform the operations described herein.

In summary, the embodiments described herein are configured to facilitate the detection of malware in a software defined networking-enabled network by sampling traffic that would otherwise go uninspected, and using SDN to route or copy the sampled traffic to an inspection device. The sampling process can ensure that communication from each endpoint is inspected at some time, thus making it probable that infections will be detected. Advantages of implementing an approach as that described herein enables inspection of otherwise un-inspected traffic and a reasonable likelihood of detecting internal malware by detecting some (but not all) of its communication. High utilization of inspection resources can be obtained and the approach is topology independent of the location of inspection services.

Thus, the embodiments described herein provide a method that includes identifying a security appliance within a software defined network, identifying candidate traffic flows flowing in the software defined network to be inspected, selecting one of the candidate traffic flows for security inspection, and communicating with a software defined network controller to cause the one of the candidate traffic flows to be redirected towards the security appliance for inspection or to cause the one of the candidate traffic flows to be copied and a resulting copy thereof forwarded to the security appliance for inspection.

The method also includes, before selecting one of the candidate flows for inspection, determining whether the security appliance has sufficient capacity to inspect traffic within the software defined network.

Selecting one of the candidate traffic flows includes selecting the one of the candidate traffic flows based on an application associated with the one of the candidate traffic flows, selecting the one of the candidate traffic flows based on a user associated with the one of the candidate traffic flows, selecting the one of the candidate traffic flows based on a destination address of the one of the candidate traffic flows, selecting the one of the candidate traffic flows based on a sensitivity level associated with a device that stores data being carried by the one of the candidate traffic flows, selecting one of the candidate traffic flows comprises randomly selecting the one of the candidate traffic flows, or selecting the one of the candidate traffic flows based on a host associated with the one of the candidate traffic flows.

In the method, the operation of redirecting may include encapsulating the one of the candidate traffic flows and sending a resulting encapsulated version of the one of the candidate traffic flows to the inspection appliance.

Copying may include causing a switch device to copy the one of the candidate traffic flows flowing through a first port of the switch device to a second port of the switch device. Copying may be implemented by a switch port analyzer (SPAN).

The embodiments described herein also provide an apparatus that includes a network interface unit configured to enable communications via a network, a memory configured to store logic instructions, and at least one processor, when executing the logic instructions, configured to: identify a security appliance within a software defined network, identify candidate traffic flows flowing in the software defined network to be inspected, select one of the candidate traffic flows for security inspection, and communicate, via the network interface unit, with a software defined network controller to cause the one of the candidate traffic flows to be redirected towards the security appliance for inspection or to cause the one of the candidate traffic flows to be copied and a resulting copy thereof forwarded to the security appliance for inspection.

The apparatus is further configured to select one of the candidate traffic flows by selecting the one of the candidate traffic flows based on an application associated with the one of the candidate traffic flows, selecting one of the candidate traffic flows by selecting the one of the candidate traffic flows based on a user associated with the one of the candidate traffic flows, selecting one of the candidate traffic flows by selecting the one of the candidate traffic flows based on a destination address of the one of the candidate traffic flows, selecting one of the candidate traffic flows by selecting the one of the candidate traffic flows based on a sensitivity level associated with a device that stores data being carried by the one of the candidate traffic flows, or selecting one of the candidate traffic flows by randomly selecting the one of the candidate traffic flows, among other possibilities.

The apparatus is further configured to cause the one of the candidate traffic flows to be encapsulated and to send a resulting encapsulated version of the one of the candidate traffic flows to the inspection appliance, or to cause the one of the candidate traffic flows to be copies and a resulting coy thereof forwarded to the inspection appliance.

The above description is intended by way of example only. Various modifications and structural changes may be made therein without departing from the scope of the concepts described herein and within the scope and range of equivalents of the claims.

What is claimed is:

1. A method comprising:
   identifying, by a network device in a software defined network, a security appliance within the software defined network;
   identifying, by the network device, candidate traffic flows, flowing within a perimeter of the software defined network, to be inspected;
   selecting, by the network device, one of the candidate traffic flows for security inspection; and
   the network device communicating with a software defined network controller to cause the one of the candidate traffic flows to be redirected from a node towards the security appliance for inspection and to cause the one of the candidate traffic flows to be further redirected, after inspection, from the security appliance to the node from which the one of the candidate traffic flows was initially redirected by the software defined network controller,
   wherein selecting the one of the candidate traffic flows comprises randomly selecting the one of the candidate traffic flows for sampling thereof, and
   wherein selecting the one of the candidate traffic flows further comprises selecting the one of the candidate traffic flows based on a risk factor and a value of data being accessed by the one of the candidate traffic flows.

2. The method of claim 1, further comprising, before selecting the one of the candidate flows for inspection, determining whether the security appliance has sufficient capacity to inspect traffic within the software defined network.

3. The method of claim 1, wherein selecting the one of the candidate traffic flows comprises selecting the one of the candidate traffic flows based on an application associated with the one of the candidate traffic flows.

4. The method of claim 1, wherein selecting the one of the candidate traffic flows comprises selecting the one of the candidate traffic flows based on a user associated with the one of the candidate traffic flows.

5. The method of claim 1, wherein the selecting one of the candidate traffic flows comprises selecting the one of the candidate traffic flows based on a destination address of the one of the candidate traffic flows.

6. The method of claim 1, wherein selecting the one of the candidate traffic flows comprises selecting the one of the candidate traffic flows based on a sensitivity level associated with a device that stores data being carried by the one of the candidate traffic flows.

7. The method of claim 1, wherein selecting the one of the candidate traffic flows comprises selecting the one of the candidate traffic flows based on a host associated with the one of the candidate traffic flows.

8. The method of claim 1, wherein redirecting comprises encapsulating the one of the candidate traffic flows and sending a resulting encapsulated version of the one of the candidate traffic flows to the security appliance.

9. An apparatus comprising:
   a network interface unit configured to enable communications via a network;
   a memory configured to store logic instructions; and
   at least one processor, when executing the logic instructions, is configured to:

identify a security appliance within a software defined network;

identify candidate traffic flows, flowing within a perimeter of the software defined network, to be inspected;

select one of the candidate traffic flows for security inspection; and communicate, via the network interface unit, with a software defined network controller to cause the one of the candidate traffic flows to be redirected from a node towards the security appliance for inspection and to cause the one of the candidate traffic flows to be further redirected, after inspection, from the security appliance to the node from which the one of the candidate traffic flows was initially redirected by the software defined network controller, wherein the at least one processor, when executing the logic instructions, is configured to select the one of the candidate traffic flows by randomly selecting the one of the candidate traffic flows for sampling thereof, and wherein the at least one processor, when executing the logic, is configured to select the one of the candidate traffic flows by selecting the one of the candidate traffic flows based on a risk factor and a value of data being accessed by the one of the candidate traffic flows.

10. The apparatus of claim 9, wherein the at least one processor, when executing the logic instructions, is configured to:

select the one of the candidate traffic flows by selecting the one of the candidate traffic flows based on an application associated with the one of the candidate traffic flows.

11. The apparatus of claim 9, wherein the at least one processor, when executing the logic instructions, is configured to:

select the one of the candidate traffic flows by selecting the one of the candidate traffic flows based on a user associated with the one of the candidate traffic flows.

12. The apparatus of claim 9, wherein the at least one processor, when executing the logic instructions, is configured to:

select the one of the candidate traffic flows by selecting the one of the candidate traffic flows based on a destination address of the one of the candidate traffic flows.

13. The apparatus of claim 9, wherein the at least one processor, when executing the logic instructions, is configured to:

select the one of the candidate traffic flows by selecting the one of the candidate traffic flows based on a sensitivity level associated with a device that stores data being carried by the one of the candidate traffic flows.

14. The apparatus of claim 9, wherein the at least one processor, when executing the logic instructions, is configured to:

cause the one of the candidate traffic flows to be encapsulated and to send a resulting encapsulated version of the one of the candidate traffic flows to the security appliance.

15. A non-transitory tangible computer readable storage media encoded with instructions that, when executed by at least one processor, is configured to cause the processor to:

identify a security appliance within a software defined network;

identify candidate traffic flows, flowing within a perimeter of the software defined network, to be inspected;

select one of the candidate traffic flows for security inspection; and communicate, via the network interface unit, with a software defined network controller to cause the one of the candidate traffic flows to be redirected from a node towards the security appliance for inspection and to cause the one of the candidate traffic flows to be further redirected, after inspection, from the security appliance to the node from which the one of the candidate traffic flows was initially redirected by the software defined network controller, wherein the instructions, when executed by the at least one processor, are configured to cause the processor to select the one of the candidate traffic flows by randomly selecting the one of the candidate traffic flows for sampling, and wherein the instructions, when executed by the at least one processor are configured to select the one of the candidate traffic flows by selecting the one of the candidate traffic flows based on a risk factor and a value of data being accessed by the one of the candidate traffic flows.

16. The non-transitory tangible computer readable storage media of claim 15, further comprising instructions to cause the processor to:

cause the one of the candidate traffic flows to be encapsulated and to send a resulting encapsulated version of the one of the candidate traffic flows to the inspection appliance.

* * * * *